US012772100B2

(12) United States Patent
Wu et al.

(10) Patent No.: US 12,772,100 B2
(45) Date of Patent: Oct. 20, 2026

(54) DELAY STATUS REPORT

(71) Applicant: NOKIA TECHNOLOGIES OY, Espoo (FI)

(72) Inventors: Chunli Wu, Beijing (CN); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/917,423

(22) Filed: Oct. 16, 2024

(65) Prior Publication Data

US 2025/0150891 A1 May 8, 2025

(30) Foreign Application Priority Data

Nov. 3, 2023 (WO) ................ PCT/CN2023/129665

(51) Int. Cl.
*H04W 28/02* (2009.01)

(52) U.S. Cl.
CPC ... *H04W 28/0268* (2013.01); *H04W 28/0231* (2013.01)

(58) Field of Classification Search
CPC ...................... H04W 28/0268; H04W 28/0231
See application file for complete search history.

(56) References Cited

U.S. PATENT DOCUMENTS 10,034,196 B2 * 7/2018 Yang ................. H04W 28/0278
2007/0047452 A1 3/2007 Lohr et al.
2014/0281034 A1 * 9/2014 Callard ................... H04L 69/28 709/247
2016/0373199 A1 * 12/2016 Olofsson ............... H04J 3/0673
2018/0077594 A1 3/2018 He et al.
2023/0217302 A1 * 7/2023 Bolleni ............. H04W 28/0278 370/328
2024/0090010 A1 * 3/2024 Ajami ............... H04W 28/0278
2024/0107363 A1 * 3/2024 Maamari ............. H04L 43/0852
2024/0196262 A1 * 6/2024 Teyeb ................... H04W 72/02
2024/0196313 A1 * 6/2024 Ryu ....................... H04W 48/16
2024/0244457 A1 * 7/2024 Jiang ..................... H04W 24/02
(Continued)

FOREIGN PATENT DOCUMENTS

CN 101292556 A 10/2008
CN 101541099 A 9/2009
(Continued)

OTHER PUBLICATIONS

International Search Report and Written Opinion dated Jul. 24, 2024 corresponding to International Patent Application No. PCT/CN2023/129665.
(Continued)

*Primary Examiner* — Mehmood B. Khan
(74) *Attorney, Agent, or Firm* — ALSTON & BIRD LLP

(57) ABSTRACT

Embodiments of the present disclosure relate to a delay status report (DSR). In an aspect, a terminal device determines a criterion for one or more data units. The one or more data units are buffered and not submitted to a lower layer in a packet data convergence protocol (PDCP). Moreover, the terminal device triggers, based on said criterion, a DSR comprising a data volume of the one or more data units and a remaining time associated with the one or more data units. In this way, it is possible to improve the DSR reporting with enhanced efficiency.

12 Claims, 7 Drawing Sheets

(56) References Cited

U.S. PATENT DOCUMENTS

| | | | | |
|---|---|---|---|---|
| 2024/0251285 | A1 | 7/2024 | He et al. | |
| 2024/0284255 | A1* | 8/2024 | Chen | H04W 28/0268 |
| 2024/0284444 | A1* | 8/2024 | Elshafie | H04W 72/541 |
| 2024/0306033 | A1* | 9/2024 | Elshafie | H04W 28/0278 |
| 2024/0357396 | A1 | 10/2024 | Kim | |
| 2024/0365388 | A1* | 10/2024 | Maamari | H04W 72/542 |
| 2024/0373288 | A1 | 11/2024 | Kim | |

FOREIGN PATENT DOCUMENTS

| | | | | |
|---|---|---|---|---|
| CN | 116261173 | A | 6/2023 | |
| CN | 116391436 | A | 7/2023 | |
| CN | 117546516 | A | 2/2024 | |
| CN | 117546575 | A | 2/2024 | |
| CN | 118042518 | A | 5/2024 | |
| EP | 2882248 | B1 | 6/2017 | |
| WO | WO-2011126311 | A2 * | 10/2011 | H04W 72/20 |
| WO | 2015/018009 | A1 | 2/2015 | |
| WO | WO-2021080993 | A1 * | 4/2021 | H04W 72/23 |
| WO | WO 2024/030494 | A1 | 2/2024 | |
| WO | WO-2024035697 | A1 * | 2/2024 | H04W 28/0268 |
| WO | WO 2024/088019 | A1 | 5/2024 | |
| WO | WO 2024/093655 | A1 | 5/2024 | |
| WO | WO 2024/156192 | A1 | 8/2024 | |
| WO | WO 2024/159484 | A1 | 8/2024 | |
| WO | WO 2024/159791 | A1 | 8/2024 | |
| WO | WO 2024/166085 | A1 | 8/2024 | |
| WO | WO 2024/167353 | A1 | 8/2024 | |
| WO | WO 2024/173672 | A1 | 8/2024 | |
| WO | WO 2024/211567 | A1 | 10/2024 | |
| WO | WO-2024205374 | A2 * | 10/2024 | H04W 28/0289 |
| WO | WO-2024211568 | A1 * | 10/2024 | H04W 40/12 |
| WO | WO 2024/230750 | A1 | 11/2024 | |

OTHER PUBLICATIONS

OPPO, "Discussion on BSR enhancement for XR," 3GPP Draft; R2-2303313, 3GPP TSG-RAN WG2 #121bis, E-meeting, Apr. 30, 2023.

3GPP TS 38.323 V17.5.0 (Jun. 2023), Technical Specification, 3rd Generation Partnership Project; Technical Specification Group Radio Access Network; NR; Packet Data Convergence Protocol (PDCP) specification (Release 17), Jun. 2023.

3GPP TS 38.322 V17.3.0 (Jun. 2023), Technical Specification, 3rd Generation Partnership Project; Technical Specification Group Radio Access Network; NR; Radio Link Control (RLC) protocol specification (Release 17), Jun. 2023.

ASUStek, "Discussion on SR configuration for DSR MAC CE", 3GPP TSG-RAN WG2 Meeting #125bis, R2-2402582, (Apr. 15-19, 2024), 5 pages.

CATT et al., "Further Discussion on DSR Triggering Modelling", 3GPP TSG-RAN WG2 Meeting #125bis, R2-2402507, (Apr. 15-19, 2024), 4 pages.

CATT, "Consideration on DSR and BSR", 3GPP TSG-RAN WG2 Meeting #123bis, R2-2309706, (Oct. 9-13, 2023), 9 pages.

CATT, "Further Discussion on DSR", 3GPP TSG-RAN WG2 Meeting #125, R2-2400106, (Feb. 26-Mar. 1, 2024), 3 pages.

Ericsson, "Discussion on BSR enhancements for XR", 3GPP TSG-RAN WG2 #124, R2-2313093, (Nov. 13-17, 2023), 10 pages.

Fujitsu, "Discussions on DSR enhancements", 3GPP TSG-RAN WG2 Meeting #127bis, R2-2408153, (Oct. 14-18, 2024), 4 pages.

Fujitsu, "Discussions on DSR", 3GPP TSG-RAN WG2 Meeting #125, R2-2400550, (Feb. 26-Mar. 1, 2024), 5 pages.

Huawei et al., "Discussion on DSR and BSR enhancements for XR", 3GPP TSG-RAN WG2 Meeting #125, R2-2401417, (Feb. 26-Mar. 1, 2024), 6 pages.

Huawei et al., "Discussion on DSR enhancements for XR", 3GPP TSG-RAN WG2 Meeting #123bis, R2-2310536, (Oct. 9-13, 2023), 4 pages.

Huawei et al., "Remaining issues for DSR and BSR", 3GPP TSG-RAN WG2 Meeting #125bis, R2-2402519, (Apr. 15-19, 2024), 4 pages.

Iit et al., "Discussion on redundancy of BSR in the presence of Dsr Mac Ce", 3GPP TSG-RAN WG2 Meeting #126, R2-2404238, (May 20-24, 2024), 14 pages.

Lenovo, "Corrections to the DSR procedure", 3GPP TSG-RAN WG2 Meeting #125bis, R2-2402948, (Apr. 15-19, 2024), 4 pages.

Lenovo, "delay information reporting for Xr", 3GPP TSG-RAN WG2 Meeting #123bis, R2-2310140, (Oct. 9-13, 2023), 7 pages.

Lenovo, "delay status reporting for Xr", 3GPP TSG-RAN WG2 Meeting #124, R2-2312097, (Nov. 13-17, 2023), 6 pages.

LG Electronics Inc., "[Post123bis][026][XR] 38.323 Running CR (LG)", 3GPP TSG-RAN WG2 Meeting #123bis, R2-23xxxxx, (Oct. 9-13, 2023), 2 pages.

LG Electronics Inc., "Discussion on BSR enhancement and delay information report", 3GPP TSG-RAN WG2 Meeting #121, R2-2301725, (Feb. 27-Mar. 3, 2023), 5 pages.

LG Electronics Inc., "Discussion on delay status report", 3GPP TSG-RAN WG2 Meeting #123bis, R2-2310602, (Oct. 9-13, 2023), 8 pages.

LG Electronics Inc., "Discussion on DSR enhancement for Xr", 3GPP TSG-RAN Meeting #127bis, R2-2409150, (Oct. 14-18, 2024), 4 pages.

LG Electronics Inc., "Introduction of XR to PDCP", 3GPP TSG-RAN2 Meeting #123bis, R2-2309847, (Oct. 9-13, 2023), 8 pages.

Nokia et al., "BSR enhancements for XR", 3GPP TSG-RAN WG2 Meeting #123, R2-2310687, (Oct. 9-13, 2023), 8 pages.

Nokia et al., "Clarification on SDU for DSR", 3GPP TSG-RAN WG2 Meeting #125bis, R2-2403408, (Apr. 15-19, 2024), 2 pages.

Nokia et al., "Remaining issues on BSR and DSR for XR", 3GPP TSG-RAN Wg2 Meeting #124, R2-2312226, (Nov. 13-17, 2023), 9 pages.

Nokia, "Status Report to TSG", 3GPP TSG RAN Meeting #102, RP-232779, (Dec 11-15, 2023), 16 pages.

OPPO, "Discussion on BSR enhancement for XR", 3GPP TSG-RAN WG2 #121bis, R2-2303313, (Apr. 2023), 3 pages.

OPPO, "Discussion on scheduling enhancements for XR", 3GPP-TSG RAN WG2 Meeting #126, R2-2404182, (May 22-26, 2024), 4 pages.

Qualcomm Incorporated, "BSR and delay status reporting for XR", 3GPP TSG-RAN WG2 Meeting #122, R2-2304711, (May 22-26, 2023), 6 pages.

Qualcomm Incorporated, "Capacity improvements for XR services", 3GPP TSG-RAN WG2 Meeting #121, R2-2300189, (Feb. 27-Mar. 4, 2023), 7 pages.

Qualcomm Incorporated, "Correction to TS 38.321", 3GPP TSG-RAN WG2 #125, R2-2402038, (Feb. 26-Mar. 1, 2024), 20 pages.

Qualcomm Incorporated, "Summary of [POST123bis][024[XR] Discussions on open issues in TS 38.321", 3GPP TSG-RAN WG2 Meeting #124, R2-2311768, (Nov. 13-17, 2023), 25 pages.

Qualcomm, "Introduction of XR enhancements", 3GPP TSG-RAN WG2 Meeting #123bis, R2-231xxxx, (Oct. 9-13, 2023), 40 pages.

Xiaomi Communications, "Discussing on BSR enhancements for XR capacity", 3GPP TSG-RAN2 Meeting #123-bis, R2-2310047, (Oct. 9-13, 2023), 5 pages.

Xiaomi Communications, "Discussing on issues on DSR and proposed TP to MAC", 3GPP TSG-RAN2 Meeting #125bis, R2-2402677, (Apr. 15-19, 2024), 3 pages.

Extended European Search Report for European Application No. 24208973.8 dated Mar. 13, 2025, 12 pages.

InterDigital Inc., "Discussion on PDU prioritization", 3GPP RAN WG2 Meeting #119-bis-e, R2-2212472, (Nov. 14-18, 2022), 3 pages.

Office Action for Taiwanese Application No. 113141755 dated Nov. 19, 2025, 24 pages.

Office Action for Taiwanese Application No. 113141755 dated Jul. 31, 2026, 12 pages.

* cited by examiner

DELAY STATUS REPORT

CROSS REFERENCE TO RELATED APPLICATION

This application claims the benefit of International Patent Application No. PCT/CN2023/129665, filed Nov. 3, 2023. The entire content of the above-referenced application is hereby incorporated by reference.

FIELD

Various example embodiments relate to the field of communications and in particular, to devices, methods, apparatuses, and computer readable storage media for a delay status report (DSR).

BACKGROUND

In communication technology, there is a constant evolution ongoing in order to provide efficient and reliable solutions for utilizing wireless communication networks. Each new generation has its own technical challenges for handling different situations and processes that are needed to connect and serve devices connected to wireless networks. To meet the demand for increased wireless data traffic since the deployment of 4th generation (4G) communication systems, efforts have been made to develop an improved 5th generation (5G), pre-5G, or 5G-advanced communication system. The new communication systems can support various types of service applications for terminal devices.

With the development of communication technologies, several technologies have been proposed. For example, a DSR procedure is used to provide a serving network device with delay status of logical channel groups (LCGs). A DSR reports an amount of data buffered with a remaining time below a threshold. The delay status reported in DSR comprises the shortest remaining time of the data buffered. However, there are still some open problems in the DSR procedure that will be studied in the near future.

SUMMARY

In general, example embodiments of the present disclosure provide a solution related to DSR.

In a first aspect, there is provided a terminal device. The terminal device comprises at least one processor and at least one memory storing instructions that, when executed by the at least one processor, cause the terminal device at least to: determine a criterion for one or more data units, the one or more data units being buffered and not submitted to a lower layer in a packet data convergence protocol, PDCP; and based on said criterion, trigger a delay status report, DSR, the DSR comprising a data volume of the one or more data units and a remaining time associated with the one or more data units.

In a second aspect, there is provided a network device. The network device comprises at least one processor and at least one memory storing instructions that, when executed by the at least one processor, cause the network device at least to: determine a criterion for one or more data units, the one or more data units being buffered and not submitted to a lower layer in a packet data convergence protocol, PDCP, at a terminal device, the criterion being used for the terminal device to determine a trigger of a delay status report, DSR, the DSR comprising a data volume of the one or more data units and a remaining time associated with the one or more data units; and transmit the criterion to the terminal device.

In a third aspect, there is provided a method. The method comprises determining, at a terminal device, a criterion for one or more data units, the one or more data units being buffered and not submitted to a lower layer in a packet data convergence protocol, PDCP; and based on said criterion, triggering a delay status report, DSR, the DSR comprising a data volume of the one or more data units and a remaining time associated with the one or more data units.

In a fourth aspect, there is provided a method. The method comprises determining, at a network device, a criterion for one or more data units, the one or more data units being buffered and not submitted to a lower layer in a packet data convergence protocol, PDCP, at a terminal device, the criterion being used for the terminal device to determine a trigger of a delay status report, DSR, the DSR comprising a data volume of the one or more data units and a remaining time associated with the one or more data units; and transmitting the criterion to the terminal device.

In a fifth aspect, there is provided an apparatus. The apparatus comprises means for determining, at a terminal device, a criterion for one or more data units, the one or more data units being buffered and not submitted to a lower layer in a packet data convergence protocol, PDCP; and based on said criterion, triggering a delay status report, DSR, the DSR comprising a data volume of the one or more data units and a remaining time associated with the one or more data units.

In a sixth aspect, there is provided an apparatus. The apparatus comprises means for determining, at a network device, a criterion for one or more data units, the one or more data units being buffered and not submitted to a lower layer in a packet data convergence protocol, PDCP, at a terminal device, the criterion being used for the terminal device to determine a trigger of a delay status report, DSR, the DSR comprising a data volume of the one or more data units and a remaining time associated with the one or more data units; and transmitting the criterion to the terminal device.

In a seventh aspect, there is provided a non-transitory computer readable medium comprising program instructions for causing an apparatus to perform at least the method according to any one of the above third and fourth aspects.

In an eighth aspect, there is provided a computer program comprising instructions, which, when executed by an apparatus, cause the apparatus at least to perform at least the method according to any one of the above third and fourth aspects.

In a ninth aspect, there is provided a terminal device. The terminal device comprises determining circuitry configured to determine a criterion for one or more data units, the one or more data units being buffered and not submitted to a lower layer in a packet data convergence protocol, PDCP; and triggering circuitry configured to, based on said criterion, trigger a delay status report, DSR, the DSR comprising a data volume of the one or more data units and a remaining time associated with the one or more data units.

In a tenth aspect, there is provided a network device. The network device comprises determining circuitry configured to determine a criterion for one or more data units, the one or more data units being buffered and not submitted to a lower layer in a packet data convergence protocol, PDCP, at a terminal device, the criterion being used for the terminal device to determine a trigger of a delay status report, DSR, the DSR comprising a data volume of the one or more data units and a remaining time associated with the one or more data units; and transmitting circuitry configured to transmit the criterion to the terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1A:
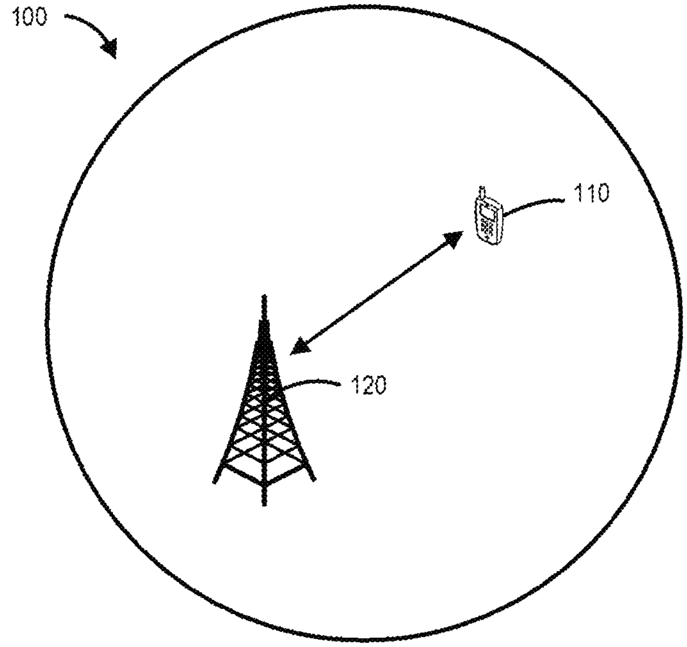
FIG. 1A illustrates an example environment in which example embodiments of the present disclosure can be implemented.

The Principle of the present disclosure will now be described with reference to some example embodiments. It is to be understood that these embodiments are described for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as new radio (NR), long term evolution (LTE), LTE-advanced (LTE-A), wideband code division multiple access (WCDMA), high-speed packet access (HSPA), narrow band internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device can access the communication network and receive services therefrom. The network device may refer to a base station (BS) or an access point (AP), for example, a node B (NodeB or NB), a radio access network (RAN) node, an evolved NodeB (eNodeB or eNB), an NR NB (also referred to as a gNB), a remote radio unit (RRU), a radio header (RH), an infrastructure device for a V2X (vehicle-to-everything) communication, a transmission and reception point (TRP), a reception point (RP), a remote radio head (RRH), a relay, an integrated access and backhaul (IAB) node, a low power node such as a femto BS, a pico BS, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the context of release 18 (Rel-18) extended reality (XR) discussions, the following has been agreed with respect to discarding:

Agreements on DSR

1. For triggering DSR, the shortest remaining-time left for the buffered data in UL is smaller than a configured threshold is used, if there is no pending DSR associated for that LCG.
2. One threshold per LCG for triggering purposes is enough for delay status report
3. The data volume calculation to be reported in the DSR will consider the at size of the full remaining PDUs in the PDU set (if any PDU within the PDU set is with remaining time below the threshold), if the PDU set discard is configured. FFS what to report for the case of not PDU set discard configured
4. Support single delay information per LCG as baseline for Rel-18 DSR. The remaining time (the shortest remaining time in the LCG) will be explicitly reported in the DSR.

As agreed, if the protocol data unit (PDU) set discard is configured, the data volume calculation to be reported in the DSR will consider the size of the full remaining PDUs in the PDU set (if any PDU within the PDU set is with remaining time below the threshold).

Moreover, the following has been captured in the MAC running change request (CR) under the third generation partnership project (3GPP) email review:

5.4.X Delay Status Reporting

The Delay Status Reporting (DSR) procedure is used to provide the serving gNB with delay status of LCGs. This delay status for an LCG includes its shortest remaining time and the amount of data associated with the reported remaining time (specified in clause 6.1.3.x).

RRC controls the DSR operation by configuring the following parameters:

- LCG-DSR-Config: the configuration that enables delay status reporting for an LCG;
- remainingTimeThreshold: the threshold on remaining time of UL data for triggering a DSR.

If an LCG is enabled for delay status reporting, the MAC entity shall if the smallest value of the PDCP discardTimer (as described in clause 7.3 in TS 38.323) among all PDUs in the LCG is below remainingTimeThreshold; and

- if no DSR has been triggered for the LCG since the last transmission of a DSR MAC CE:
  - triggers a DSR for the LCG.

Editor's Notes: FFS whether to include the case that a DSR was triggered but cancelled (e.g. due to PDU discard)

Editor's Notes: Additional aspects of DSR operations need to be specified, e.g. How to send a DSR MAC CE after a DSR is triggered, conditions for cancelling a DSR, etc.

It has been observed that for the triggering as currently agreed and captured in MAC CR, it checks the smallest value of the packet data convergence protocol (PDCP) discardTimer (as described in clause 7.3 in the technical specification (TS) 38.323) among all PDUs in the LCG is below the remainingTimeThreshold without considering whether the data has been transmitted or not. Since PDCP SDUs are kept in the buffer until the PDCP discard timer expires (i.e. they are not discarded after being submitted to the lower layer, in case there is a retransmission needed upon handover (HO)), it is problematic to continuously trigger DSR for already transmitted data since the report would signal no data volume according to what is specified in PDCP.

Besides, in the current triggering mechanism, as long as the smallest remaining time is below the threshold and there is no pending DSR triggered, the UE will trigger a DSR. As a result, the UE may continuously trigger DSR even when canceled after transmission because the data sits in the buffer as long as it is not transmitted. In other words, any data triggering a DSR that is not sent together with the DSR may keep on triggering new DSRs.

The condition "if no DSR has been triggered for the LCG since the last transmission of a DSR MAC CE" does not serve the purpose of preventing the UE from triggering and reporting the same data with remaining time below threshold since the triggered DSR is canceled after the MAC PDU including the DSR is transmitted. The same data may then trigger another DSR which does not provide new information unless there is new data with remaining time below the threshold.

The following example table 1 gives an example DSR trigger based on the current DSR trigger mechanism.

TABLE 1 example DSR trigger

| t | Buffered PDUs | | | | | | | | DSR Trigger | DSR |
|---|---|---|---|---|---|---|---|---|---|---|
| 0 | 9 9 | 6 6 6 | 6 | 4 | 4 | 4 | 4 | 4 | N | — |
| 1 | 8 8 | 5 5 5 | 5 | 3 | 3 | 3 | 3 | 3 | Y | 5 PDUs |
| 2 | 7 7 | 4 4 4 | 4 | 2 | 2 | 2 | T | T | Y | 3 PDUs |
| 3 | 6 6 | 3 3 3 | 3 | 1 | 1 | T | | | Y | 6 PDUs |
| 4 | 5 5 | 2 2 2 | T | D | D | D | D | D | Y | 3 PDUs |
| 5 | 4 4 | 1 1 T | T | | | | | | Y | 2 PDUs |

As shown in Table 1, the threshold for reporting (for example, referred to as remainingTimeThreshold) is assumed to be 4. The number of PDUs reported refers to the data volume of those PDUs. Whenever a DSR is sent, the trigger is canceled after the transmission of the DSR.

At t=0, 5 PDUs with a remaining time of 4, 4 PDUs with a remaining time of 6, and 2 PDUs with a remaining time of 9 are buffered;

At t=1, a DSR is triggered and sent to signal 5 PDUs, no PDUs are sent due to lack of space (other logical channels (LCHs) occupy the transport block);

At t=2, another DSR is triggered, 2 PDUs are sent (marked with T), and the DSR signals 3 PDUs;

At t=3, another DSR is triggered, one PDU is sent, and the DSR signals 6 PDUs;

At t=4, another DSR is triggered, 5 PDUs are discarded (marked with D), one PDU is sent, and the DSR signals 3 PDUs;

At t=5, another DSR is triggered, 2 PDUs are sent, and the DSR signals 2 PDUs.

It can be seen that the DSR at t=2, t-4 and t=5 are useless and may increase uplink overhead.

Thus, as of now, there is no effective way to trigger the DSR. Thus, optimizing the DSR trigger mechanism is still an important issue to be solved.

According to embodiments of the present disclosure, there is provided a scheme for DSR, more specifically, DSR trigger. With this scheme, a terminal device determines a criterion for one or more data units. The one or more data units are buffered and not submitted to a lower layer in a PDCP. Moreover, the terminal device triggers, based on said criterion, a DSR comprising a data volume of the one or more data units, and a remaining time associated with the one or more data units.

By considering the one or more data units buffered and not submitted to the lower layer in the PDCP, it is allowed to reduce signaling overhead at the terminal device efficiently. In this way, it is possible to improve the power utilization at the terminal device.

Hereinafter, principles and embodiments of the present disclosure will be described in detail below with reference to the accompanying drawings. Reference is first made to FIG. 1A, which illustrates an example environment 100 in which example embodiments of the present disclosure can be implemented.

The environment 100, which may be a part of a communication network, comprises a terminal device 110 and a network device 120 communicating with each other. The communication between the terminal device 110 and the network device 120 may be direct or indirect. As an example, the terminal device 110 and the network device 120 may communicate with one or more further devices not shown in FIG. 1A.

To transmit data and/or control information, the terminal device 110 may perform communications with the network device 120. A link from the network device 120 to the terminal device 110 is referred to as a downlink (DL), while a link from the terminal device 110 to the network device 120 is referred to as an uplink (UL).

Although the terminal device 110 and the network device 120 are described in the communication environment 100 of FIG. 1A, embodiments of the present disclosure may equally apply to any other suitable communication devices in communication with one another. That is, embodiments of the present disclosure are not limited to the exemplary scenarios of FIG. 1A. In this regard, it is noted that although the terminal device is schematically depicted as a mobile phone and the network device 120 is schematically depicted as a base station in FIG. 1A, it is understood that these depictions are exemplary in nature without suggesting any limitation. In other embodiments, the first device 110 and the network device 120 may be any other communication devices, for example, any other wireless communication devices.

It is to be understood that the particular number of various communication devices and the particular number of various communication links as shown in FIG. 1A is for illustration purpose only without suggesting any limitations. The communication environment 100 may include any suitable number of communication devices and any suitable number of communication links for implementing embodiments of the present disclosure. In addition, it should be appreciated that there may be various wireless as well as wireline communications (if needed) among all of the communication devices.

The communications in the environment 100 may follow any suitable communication standards or protocols, which are already in existence or to be developed in the future, such as universal mobile telecommunications system (UMTS), long term evolution (LTE), LTE-advanced (LTE-A), the fifth generation (5G) new radio (NR), wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connectivity (DC), and new radio unlicensed (NR-U) technologies.

Figure 1B:
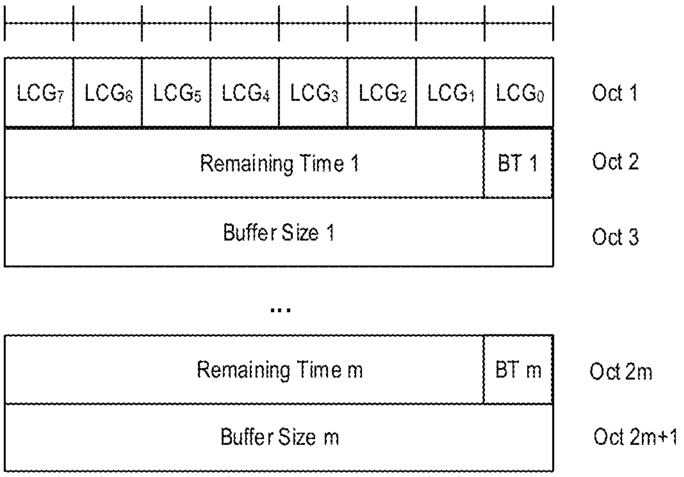
FIG. 1B illustrates an example DSR media access control (MAC) control element (CE) associated with some example embodiments of the present disclosure.

FIG. 1B illustrates an example DSR MAC CE associated with some example embodiments of the present disclosure. The DSR MAC CE is identified by the MAC subheader with an extended logical channel identifier (eLCID) as specified. The Buffer Size field may indicate the total size of all PDUs that are in the same PDU set as the PDU which triggered the DSR for the corresponding logical channel group and have remaining times below the remainingTimeThreshold at the time when the MAC PDU which contains this DSR MAC CE is assembled, if pdu-SetDiscard is configured. The Buffer Size field may indicate the total size of all PDUs with remaining time below the remainingTimeThreshold of multiple PDU sets comprising a PDU set triggering the DSR. In this case, if any data the PDU set triggering the DSR has a remaining time below the remainingTimeThreshold, then the whole PDU set may be reflected in the buffer size calculation. Other data not belonging to the PDU set as well with remaining time below the remaining TimeThreshold may be reflected in the buffer size calculation. This total size is calculated according to the data volume calculation procedure in TS 38.322 and TS 38.323 and is indicated in bytes.

Figure 2:
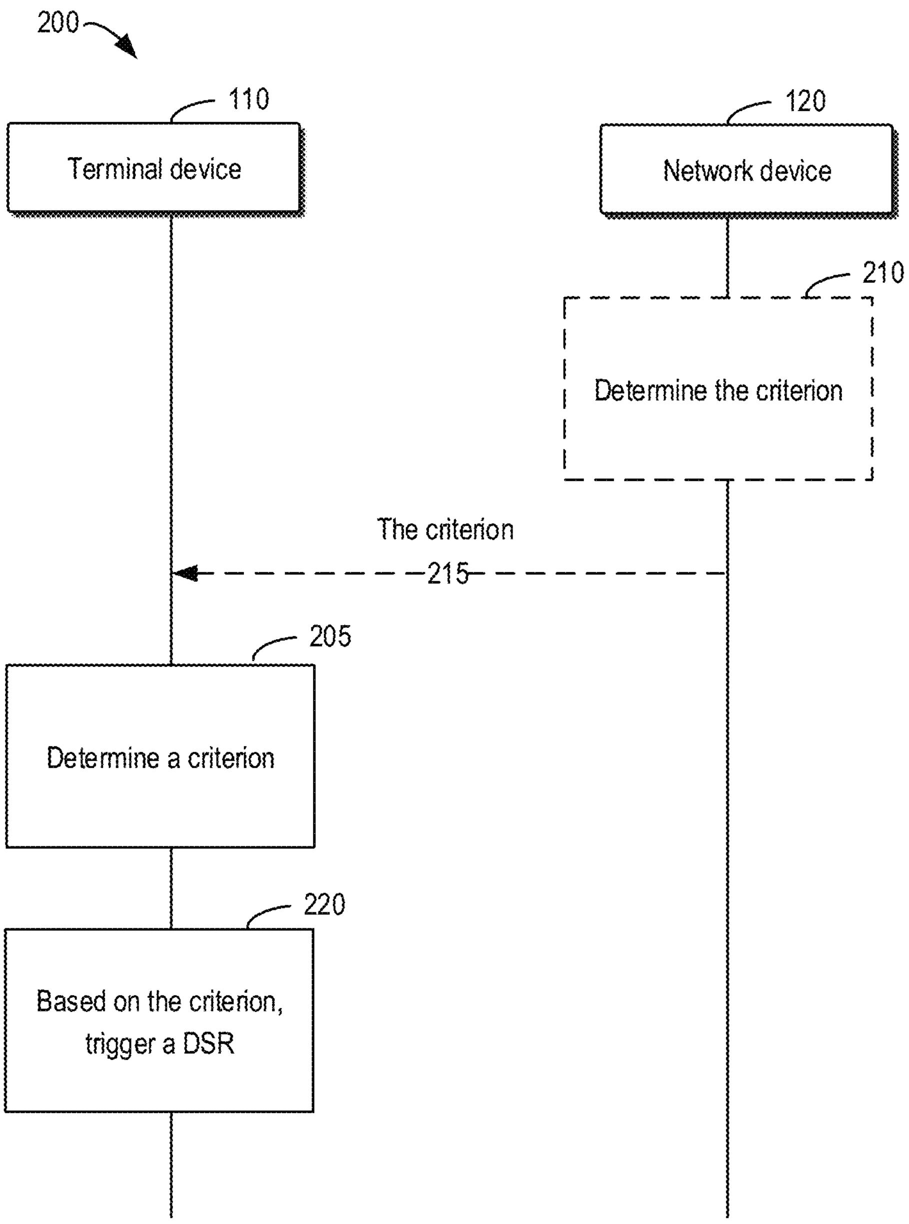
FIG. 2 illustrates a signaling flow between a terminal device and a network device according to some example embodiments of the present disclosure.

FIG. 2 illustrates a signaling flow 200 between a terminal device and a network device according to some example embodiments of the present disclosure. For the purpose of discussion, the signaling flow 200 will be described with reference to FIG. 1A.

As shown in FIG. 2, the terminal device 110 determines (205) a criterion for one or more data units. The one or more data units may be buffered and not submitted to a lower layer in a PDCP. The one or more data units may be in an LCG. A data unit of the one or more data units may comprise a service data unit (SDU) or a PDU. The one or more data units may comprise at least one SDU and/or at least one PDU.

The criterion may be used to trigger a DSR. The terminal device 110 may determine whether the criterion is met, and then on this basis, determine whether to trigger the DSR. The DSR may comprise a data volume of the one or more data units and a remaining time associated with the one or more data units. The remaining time may be associated with data unit discarding. As an example, the remaining time may comprise the shortest remaining time of one or more remaining time of the one or more data units. As another example, the remaining time may comprise a remaining time of any data unit of the one or more data units. Each of the one or more data units may have its own remaining time based on its PDCP discard timer. A remaining time of a data unit of the one or more data units may comprise a duration before the data unit is discarded when its associated PDCP discard timer expires. In the former example, the shortest remaining time determined from all one or more remaining time of all the one or more data units may be reported in the DSR.

In some example embodiments, the criterion may comprise the remaining time being below a threshold. In this case, the DSR may be triggered if the remaining time associated with the one or more data units that are not submitted to the lower layer is below the threshold. As an example, the threshold may be pre-defined. As another example, the threshold may be configured by the network device. In this case, the threshold may be determined by the network device 120 and transmitted to the terminal device 110. For example, a data unit of the one or more data units with a remaining time below the threshold its associated PDCP discard timer expires may be referred to as a delay-critical data unit.

In some example embodiments, the criterion may comprise a determination that the one or more data units comprise at least one data unit with the remaining time below the threshold, and that the at least one data unit is not reflected in a data volume calculation of a previous reported DSR. In this case, there is a need to check if there is any new data unit that has a remaining time becoming below the threshold and that is not indicated in the previous DSR, for example, reported in the last transmission of a DSR MAC CE. Based on this criterion, the DSR may be triggered if a remaining time of a new data unit becomes below the threshold and the new data unit is not reflected in a data volume calculation of a previous DSR.

In some example embodiments, the criterion may be pre-defined, for example, in the specification. In this case, the terminal device 110 may determine the criterion from the specification. In some other example embodiments, the network device 120 may configure the terminal device 110 with the criterion. In this case, as shown in FIG. 2, the network device 110 may determine (210) the criterion and transmit (215) the criterion to the terminal device 110. In this case, the terminal device 110 may determine the criterion by receiving the criterion from the network device 120. This may also be considered as a determination of the criterion by the terminal device 110.

Then, after determining the criterion, as shown in FIG. 2, the terminal device 110 triggers (220) the DSR based on the criterion. For example, if the criterion is fulfilled, the terminal device 110 may trigger the DSR.

In some example embodiments, before triggering the DSR, the terminal device 110 may build a transport block including at least one data unit. If at least one data unit with the remaining time below the threshold is left after building the transport block, the one or more data units that the criterion is for may be determined as the at least one data unit left after building the transport block. That is, the at least one data unit left after building the transport block may be reflected in a data volume calculation of the DSR. In other words, the terminal device 110 may exclude the at least one data unit comprised in the transport block from the one or more data units for determining the triggering of the DSR.

In some example embodiments, if discarding of the one or more data units happens frequently, for example, for XR, it is worth considering the potential discarding as well in case data units may be discarded before the next possible transmission possibility, for example, due to time division duplex (TDD) configuration. Thus, the terminal device 110 may take into account the potential discarding and next possible UL transmission opportunity when determining the data volume value in the DSR.

As a more specific example, the data volume calculation, for example, in the procedure in the current related specification may be amended as follows:

5.6 Data Volume Calculation

For the purpose of MAC buffer status reporting, the transmitting PDCP entity shall consider the following as PDCP data volume:
- the PDCP SDUs for which no PDCP Data PDUs have been constructed and with remaining time before PDCP discard timer expiry not less than the time to the next uplink transmission opportunity considering the TDD configuration;
- the PDCP Data PDUs that have not been submitted to lower layers and with remaining time before PDCP discard timer expiry not less than the time to the next uplink transmission opportunity considering the TDD configuration;
- the PDCP Control PDUs;
- for AM DRBs, the PDCP SDUs to be retransmitted according to clause 5.1.2 and clause 5.13;
- for AM DRBs, the PDCP Data PDUs to be retransmitted according to clause 5.5.

For the purpose of MAC delay status reporting, the transmitting PDCP entity shall consider the following as delay-critical PDCP data volume:
- if pdu-SetDiscard is configured:
  - the PDCP SDUs belonging to the delay-critical PDU Sets for which no PDCP Data PDUs have been constructed if the remaining time for any PDCP SDU within the PDU set before PDCP discard timer expiry is below remaining TimeThreshold;
  - the PDCP Data PDUs that contain the PDCP SDUs belonging to the delay-critical PDU Sets and have not been submitted to lower layers;
- else:
  - the delay-critical PDCP SDUs for which no PDCP Data PDUs have been constructed for the PDCP SDUs with the remaining time before PDCP discard timer expiry is below remaining TimeThreshold;

the PDCP Data PDUs that contain the delay-critical PDCP SDUs and have not been submitted to lower layers.]

In some example embodiments, the terminal device 110 may transmit the DSR to a network device, if there is an available resource for the DSR, for example, based on an UL grant. For example, a scheduling request (SR) may be triggered if there is no UL grant for the DSR transmission. Accordingly, the network device 120 may receive the DSR from the terminal device 110. After the DSR is transmitted, the trigger may be canceled after the transmission of the DSR.

The following example table 2 gives an example DSR trigger based on the above trigger criterion.

TABLE 2 example DSR trigger

| t | Buffered PDUs | | | | | | | | DSR Trigger | DSR |
|---|---|---|---|---|---|---|---|---|---|---|
| 0 | 9 9 | 6 6 6 | 6 | 4 | 4 | 4 | 4 | 4 | N | — |
| 1 | 8 8 | 5 5 5 | 5 | 3 | 3 | 3 | 3 | 3 | Y | 5 PDUs |
| 2 | 7 7 | 4 4 4 | 4 | 2 | 2 | 2 | T | T | N | — |
| 3 | 6 6 | 3 3 3 | 3 | 1 | 1 | T | | | Y | 6 PDUs |
| 4 | 5 5 | 2 2 2 | T | D | D | D | D | D | N | — |
| 5 | 4 4 | 1 1 T | T | | | | | | N | — |

As shown in Table 2, the threshold for reporting (for example, referred to as remainingTimeThreshold) may be assumed to be 4. The number of PDUs reported may refer to the data volume of those PDUs.

At t=0, 5 PDUs with a remaining time of 4, 4 PDUs with a remaining time of 6, and 2 PDUs with a remaining time of 9 are buffered;

At t=1, a DSR is triggered and sent to signal 5 PDUs, no PDUs are sent due to lack of space (other LCHs occupy the transport block);

At t=2, no new DSR is triggered since all the 5 remaining PDUs before building the transport block (alternatively, 3 remaining PDUs left after building the TB) have been reported in the previous DSR already;

At t=3, a new DSR is triggered since new PDUs with a remaining time crossing the threshold occur, one PDU is sent, and the DSR signals 6 PDUs;

At t=4, no new DSR is triggered, one PDU is sent and five PDUs are discarded;

At t=5, no new DSR is triggered, two PDUs are sent.

It can be seen that, with the proposed criterion, no useless DSR is sent and it ensures the new data with the remaining time becoming below the threshold may also trigger a DSR.

As a more specific example, the DSR trigger based on the above criterion, for example, in the procedure in the current related specification may be amended as follows:

5.4.X Delay Status Reporting

The Delay Status Reporting (DSR) procedure is used to provide the serving gNB with delay status of LCGs. This delay status for an LCG includes its shortest remaining time and the amount of data associated with the reported remaining time (specified in clause 6.1.3.x).

RRC controls the DSR operation by configuring the following parameters:

LCG-DSR-Config: the configuration that enables delay status reporting for an LCG;

remainingTimeThreshold: the threshold on remaining time of UL data for triggering a DSR.

If an LCG is enabled for delay status reporting, the MAC entity shall

1> if the smallest value of the PDCP discardTimer (as described in clause 7.3 in TS 38.323 [4]) among all PDCP SDUs/PDUs that have not been submitted to the lower layer in PDCP in the LCG is below remainingTimeThreshold; and 1> if there is new PDCP SDU/PDU for the LCG that has not been submitted to the lower layer in PDCP becomes below remainingTimeThreshold and that has not been indicated in the last transmission of a DSR MAC CE; and 1> if no DSR has been triggered for the LCG since the last transmission of a DSR MAC CE:

3> triggers a DSR for the LCG.

Editor's Notes: FFS whether to include the case that a DSR was triggered but cancelled (e.g. due to PDU discard)

Editor's Notes: Additional aspects of DSR operations need to be specified, e.g. How to send a DSR MAC CE after a DSR is triggered, conditions for cancelling a DSR, etc.

In some example embodiments, the triggering of the DSR may be canceled. For example, the triggering of the DSR may be canceled when the MAC PDU with the DSR MAC CE is transmitted. As an example, the triggering of the DSR may be canceled if the DSR is comprised in a MAC data unit, for example, included in a MAC PDU. As another example, the triggering of the DSR may be canceled if a resource is available for transmitting the one or more data units. The triggering of the DSR may be canceled if the one or more data units with remaining time(s) below the threshold are comprised in a MAC data unit, for example, included in a MAC PDU. In this case, there is no need to check if there is enough space since it is useless to report a DSR with a data volume of 0. Then, the remaining space may be used for other purposes, for example, to report a buffer status report (BSR).

Besides, the triggering of the DSR may be canceled if all the one or more data units with remaining time(s) below the threshold are discarded before a MAC data unit comprising the DSR is assembled, for example, due to a long delay between the triggering and getting an UL grant to transmit it. In other words, the triggering of the DSR may be canceled if the one or more data units are discarded before the DSR is able to be transmitted.

As a more specific example, the data volume calculation, for example, in the procedure in the current related specification may be amended as follows:

All the DSR(s) triggered prior to MAC PDU assembly shall cancelled when the MAC PDU which contains buffer status up to (and including) the last event that triggered a DSR prior to the MAC PDU assembly.

All triggered DSR(s) are cancelled if no data with remaining time below threshold left in the buffer if all the data with remaining time below remainingTimeThreshold have been included in the MAC PDU or all the data with remaining time below remainingTimeThreshold are discarded before a MAC PDU including DSR is able to be assembled.

Alternatively or additionally, after determining the criterion, if the terminal device 110 determines that the one or more data units have been reflected in a data volume calculation of a previous reported DSR, the terminal device 110 may not trigger a DSR.

According to some embodiments with reference to FIG. 2, for DSR trigger, by excluding one or more data units (for example, PDCP SDUs/PDUs) that have already been submitted to the lower layer, when checking the shortest/smallest remaining time of all the data units in the MAC layer, it is allowed to reduce signaling overhead at the terminal device efficiently. In this way, it is possible to improve the DSR reporting with enhanced efficiency.

Figure 3:
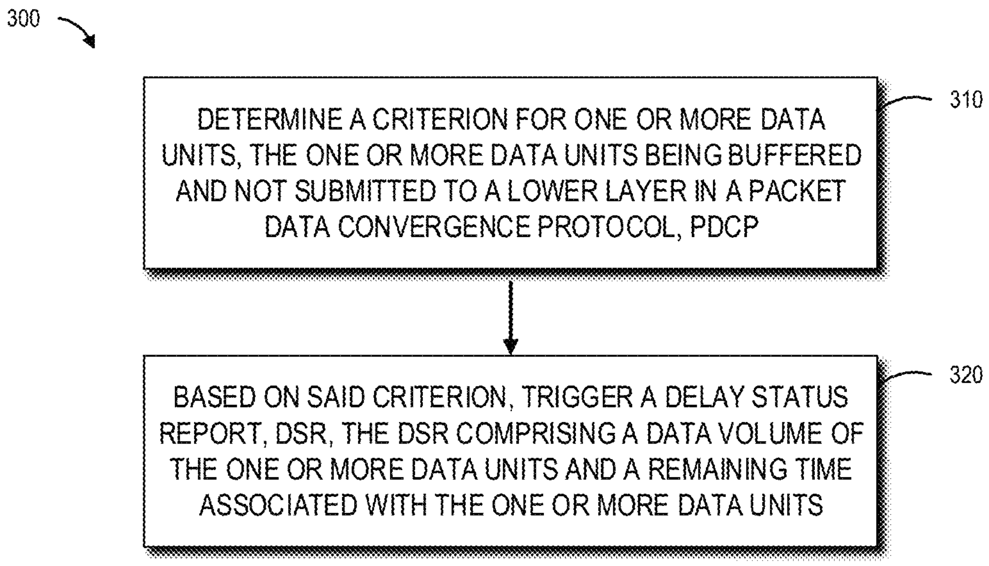
FIG. 3 illustrates a flowchart of a method implemented at a terminal device according to some embodiments of the present disclosure.

FIG. 3 illustrates a flowchart 300 of a method implemented at a terminal device according to some embodiments of the present disclosure. For the purpose of discussion, the method 300 will be described from the perspective of the terminal device 110 with reference to FIG. 1A.

At block 310, the terminal device 110 determines a criterion for one or more data units, the one or more data units being buffered and not submitted to a lower layer in a packet data convergence protocol, PDCP. At block 320, the terminal device 110 triggers, based on said criterion, a delay status report, DSR, the DSR comprising a data volume of the one or more data units and a remaining time associated with the one or more data units.

In some example embodiments, the one or more data units may be in a logical channel group, LCG.

In some example embodiments, the remaining time may comprise one of the following: a shortest remaining time of one or more remaining time of the one or more data units; or a remaining time of any data unit of the one or more data units.

In some example embodiments, the criterion may comprise a remaining time of a data unit of the one or more data units being below a threshold. In some example embodiments, the threshold may be pre-defined or received from a network device 120.

In some example embodiments, a remaining time of a data unit of the one or more data units may comprise a duration before the data unit is discarded when its associated PDCP discard timer expires.

In some example embodiments, the criterion may comprise: a determination that the one or more data units comprise at least one data unit with the remaining time below a threshold, and that the at least one data unit is not reflected in a data volume calculation of a previous reported DSR. In some example embodiments, the threshold may be pre-defined or received from a network device 120.

In some example embodiments, the terminal device 110 may further prevent from triggering a DSR, based on determining that the one or more data units have been reflected in a data volume calculation of a previous reported DSR.

In some example embodiments, the terminal device 110 may further build a transport block; determine that at least one data unit is left after building the transport block; and determine the one or more data units as the at least one data unit left after building the transport block.

In some example embodiments, the terminal device 110 may further cancel the triggering of the DSR based on determining at least one of the following: the DSR is comprised in a media access control, MAC, data unit; the one or more data units are discarded before a MAC data unit comprising the DSR is assembled; or a resource is available for transmitting the one or more data units.

In some example embodiments, the terminal device 110 may further build a transport block comprising at least one data unit; and exclude the at least one data unit comprised in the transport block from the one or more data units for determining the triggering of the DSR.

In some example embodiments, a data unit of the one or more data units may comprise at least one of the following: a service data unit, SDU; or a protocol data unit, PDU.

In some example embodiments, the criterion is predefined or received from a network device 120.

In some example embodiments, the terminal device 110 may further transmit the DSR to a network device 120.

In some example embodiments, the terminal device 110 may further determine whether the criterion is met, and to trigger the DSR, the terminal device 110 may, based on determining that said criterion is met, trigger the DSR.

Figure 4:
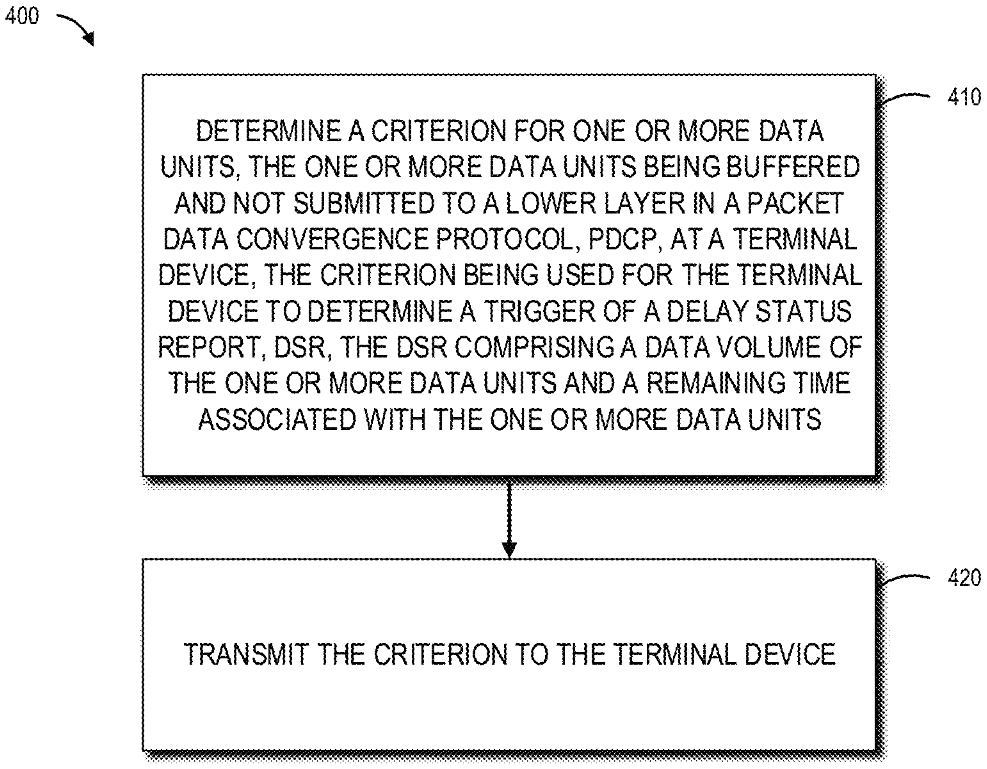
FIG. 4 illustrates a flowchart of a method implemented at a network device according to some embodiments of the present disclosure.

FIG. 4 illustrates a flowchart 400 of a method implemented at a network device according to some embodiments of the present disclosure. For the purpose of discussion, the method 400 will be described from the perspective of the network device 120 with reference to FIG. 1A.

At block 410, the network device 120 determines a criterion for one or more data units, the one or more data units being buffered and not submitted to a lower layer in a packet data convergence protocol, PDCP, at a terminal device 110, the criterion being used for the terminal device to determine a trigger of a delay status report, DSR, the DSR comprising a data volume of the one or more data units and a remaining time associated with the one or more data units. At block 420, the network device 120 transmits the criterion to the terminal device 110.

In some example embodiments, the one or more data units may be in a logical channel group, LCG.

In some example embodiments, the remaining time may comprise one of the following: a shortest remaining time of one or more remaining time of the one or more data units; or a remaining time of any data unit of the one or more data units.

In some example embodiments, the criterion may comprise a remaining time of a data unit of the one or more data units being below a threshold. In some example embodiments, the network device 120 may further determine the threshold; and transmit the threshold to the terminal device 110.

In some example embodiments, a remaining time of a data unit of the one or more data units may comprise a duration before the data unit is discarded when its associated PDCP discard timer expires.

In some example embodiments, the criterion may comprises: a determination that the one or more data units comprise at least one data unit with a remaining time below a threshold, and that the at least one data unit is not reflected in a data volume calculation of a previous reported DSR. In some example embodiments, the network device 120 may further determine the threshold; and transmit the threshold to the terminal device 110.

In some example embodiments, a data unit of the one or more data units comprises at least one of the following: a service data unit, SDU; or a protocol data unit, PDU.

In some example embodiments, the network device 120 may further receive a DSR from the terminal device 110, the DSR comprising a data volume of the one or more data units and a remaining time associated with the one or more data units.

In some example embodiments, an apparatus capable of performing the method 300 (for example, the terminal device 110) may comprise means for performing the respective steps of the method 300. The means may be implemented in any suitable form. For example, the means may be implemented in a circuitry or software module.

In some example embodiments, the apparatus comprises means for determining a criterion for one or more data units, the one or more data units being buffered and not submitted to a lower layer in a packet data convergence protocol, PDCP; and means for, based on said criterion, triggering a delay status report, DSR, the DSR comprising a data volume of the one or more data units and a remaining time associated with the one or more data units.

In some example embodiments, the one or more data units are in a logical channel group, LCG.

In some example embodiments, the remaining time comprises one of the following: a shortest remaining time of one or more remaining time of the one or more data units; or a remaining time of any data unit of the one or more data units.

In some example embodiments, the criterion comprises a remaining time of a data unit of the one or more data units being below a threshold. In some example embodiments, the threshold is pre-defined or received from a network device.

In some example embodiments, a remaining time of a data unit of the one or more data units comprises a duration before a data unit associated with the remaining time is discarded when a PDCP discard timer expires.

In some example embodiments, the criterion comprises: a determination that the one or more data units comprise at least one data unit with the remaining time below a threshold, and that the at least one data unit is not reflected in a data volume calculation of a previous reported DSR. In some example embodiments, the threshold is pre-defined or received from a network device.

In some example embodiments, the apparatus further comprises means for, based on determining that the one or more data units have been reflected in a data volume calculation of a previous reported DSR, preventing from triggering a DSR.

In some example embodiments, the apparatus further comprises means for building a transport block; means for determining that at least one data unit is left after building the transport block; and means for determining the one or more data units as the at least one data unit left after building the transport block.

In some example embodiments, the apparatus further comprises means for canceling the triggering of the DSR based on determining at least one of the following: the DSR is comprised in a media access control, MAC, data unit; the one or more data units are discarded before a MAC data unit comprising the DSR is assembled; or a resource is available for transmitting the one or more data units.

In some example embodiments, the apparatus further comprises means for building a transport block comprising at least one data unit; and means for excluding the at least one data unit comprised in the transport block from the one or more data units for determining the triggering of the DSR.

In some example embodiments, a data unit of the one or more data units comprises at least one of the following: a service data unit, SDU; or a protocol data unit, PDU.

In some example embodiments, the criterion is pre-defined or received from a network device.

In some example embodiments, the apparatus further comprises means for transmitting the DSR to a network device.

In some example embodiments, the apparatus further comprises means for determining whether the criterion is met, and the means for triggering the DSR comprises means for, based on determining that said criterion is met, triggering the DSR In some embodiments, the apparatus further comprises means for performing other steps in some embodiments of the method 300. In some embodiments, the means comprises at least one processor and at least one memory including computer program code, the at least one memory and computer program code configured to, with the at least one processor, cause the performance of the apparatus.

In some example embodiments, an apparatus capable of performing the method 400 (for example, the network device 120) may comprise means for performing the respective steps of the method 400. The means may be implemented in any suitable form. For example, the means may be implemented in a circuitry or software module.

In some example embodiments, the apparatus comprises means for determining a criterion for one or more data units, the one or more data units being buffered and not submitted to a lower layer in a packet data convergence protocol, PDCP, at a terminal device, the criterion being used for the terminal device to determine a trigger of a delay status report, DSR at the terminal device, the DSR comprising a data volume of the one or more data units and a remaining time associated with the one or more data units; and means for transmitting the criterion to the terminal device.

In some example embodiments, the one or more data units are in a logical channel group, LCG.

In some example embodiments, the remaining time comprises one of the following: a shortest remaining time of one or more remaining time of the one or more data units; or a remaining time of any data unit of the one or more data units.

In some example embodiments, the criterion comprises a remaining time of a data unit of the one or more data units being below a threshold. In some example embodiments, a remaining time of a data unit of the one or more data units comprises a duration before the data unit is discarded when its associated PDCP discard timer expires. In some example embodiments, the apparatus further comprises means for determining the threshold; and means for transmitting the threshold to the terminal device.

In some example embodiments, the criterion comprises: a determination that the one or more data units comprise at least one data unit with a remaining time below a threshold, and that the at least one data unit is not reflected in a data volume calculation of a previous reported DSR. In some example embodiments, the apparatus further comprises means for determining the threshold; and means for transmitting the threshold to the terminal device.

In some example embodiments, a data unit of the one or more data units comprises at least one of the following: a service data unit, SDU; or a protocol data unit, PDU.

In some example embodiments, the apparatus further comprises means for determining the criterion; and means for transmitting the criterion to the terminal device.

In some example embodiments, the apparatus further comprises means for receiving a DSR from the terminal device, the DSR comprising a data volume of the one or more data units and a remaining time associated with the one or more data units.

In some embodiments, the apparatus further comprises means for performing other steps in some embodiments of the method 400. In some embodiments, the means comprises at least one processor and at least one memory including computer program code, the at least one memory and computer program code configured to, with the at least one processor, cause the performance of the apparatus.

Figure 5:
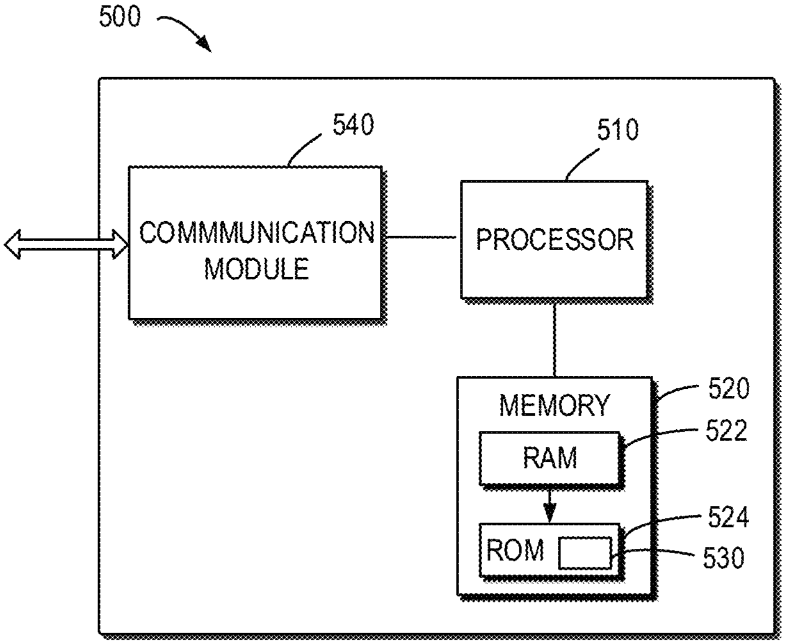
FIG. 5 illustrates a simplified block diagram of a device that is suitable for implementing some example embodiments of the present disclosure.

FIG. 5 illustrates a simplified block diagram of a device 500 that is suitable for implementing some example embodiments of the present disclosure. The device 500 may be provided to implement the communication device, for example, the terminal device 110, or the network device 120 as shown in FIG. 1A. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIG. 2. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Figure 6:
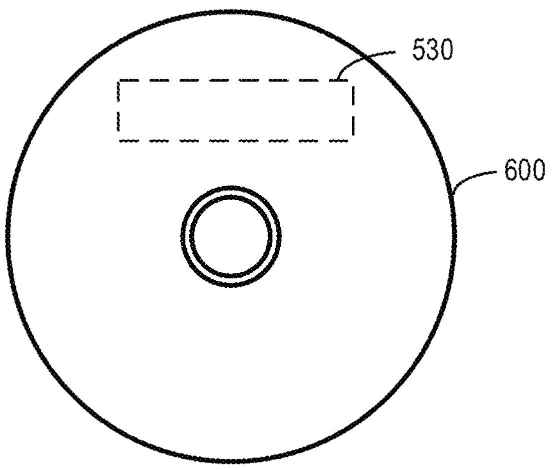
FIG. 6 illustrates a block diagram of an example of a computer readable medium in accordance with some example embodiments of the present disclosure.

FIG. 6 illustrates a block diagram of an example of a computer readable medium 600 in accordance with some example embodiments of the present disclosure. The computer readable medium 600 has the program 530 stored thereon. It is noted that although the computer readable medium 600 is depicted in form of CD or DVD in FIG. 6, the computer readable medium 600 may be in any other form suitable for carrying or holding the program 530.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to any of FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
at least one processor; and
at least one memory storing instructions that, when executed by the at least one processor, cause the terminal device at least to:
determine a criterion for one or more data units, the one or more data units being buffered and not submitted to a lower layer in a packet data convergence protocol, PDCP, wherein the criterion comprises a determination that the one or more data units comprise at least one data unit with the remaining time below a threshold, and that the at least one data unit is not reflected in a data volume calculation of a previous reported delay status report, DSR;
determine whether the criterion is met; and
based on determining that said criterion is met, trigger a DSR, the DSR comprising a) a Buffer Size field indicating a total size of a data volume comprising a data volume of the one or more data units and b) a remaining time associated with the one or more data units.

2. The terminal device of claim 1, wherein the one or more data units are in a logical channel group, LCG.

3. The terminal device of claim 1, wherein the remaining time comprises one of the following:
a shortest remaining time of one or more remaining time of the one or more data units; or
a remaining time of any data unit of the one or more data units.

4. The terminal device of claim 1, wherein a remaining time of a data unit of the one or more data units comprises a duration before the data unit is discarded when its associated PDCP discard timer expires.

5. The terminal device of claim 1, wherein the terminal device is further caused to:
based on determining that the one or more data units have been reflected in a data volume calculation of a previous reported DSR, prevent from triggering a DSR.

6. The terminal device of claim 1, wherein the terminal device is further caused to:
build a transport block;
determine that at least one data unit is left after building the transport block; and
determine the one or more data units as the at least one data unit left after building the transport block.

7. The terminal device of claim 1, wherein the terminal device is further caused to:
cancel the triggering of the DSR based on determining at least one of the following:
the DSR is comprised in a media access control, MAC, data unit;
the one or more data units are discarded before a MAC data unit comprising the DSR is assembled; or
a resource is available for transmitting the one or more data units.

8. The terminal device of claim 1, wherein a data unit of the one or more data units comprises at least one of the following:
a service data unit, SDU; or
a protocol data unit, PDU.

9. The terminal device of claim 1, wherein the threshold is pre-defined or received from a network device.

10. The terminal device of claim 1, wherein the terminal device is further caused to:
transmit the DSR to a network device.

11. A method, comprising:
determining, at a terminal device, a criterion for one or more data units, the one or more data units being buffered and not submitted to a lower layer in a packet data convergence protocol, PDCP, wherein the criterion comprises a determination that the one or more data units comprise at least one data unit with the remaining time below a threshold, and that the at least one data unit is not reflected in a data volume calculation of a previous reported delay status report, DSR;
determining whether the criterion is met; and
based on determining that said criterion is met, triggering a DSR, the DSR comprising a) a Buffer Size field indicating a total size of a data volume comprising a data volume of the one or more data units and b) a remaining time associated with the one or more data units.

12. The terminal device of claim 1, wherein the terminal device is further caused to:
build a transport block comprising at least one data unit; and
exclude the at least one data unit comprised in the transport block from the one or more data units for determining the triggering of the DSR.

* * * * *